(Model.)
F. CREMER.
COMBINED PLOW AND CULTIVATOR.
No. 254,620. Patented Mar. 7, 1882.
2 Sheets—Sheet 1.
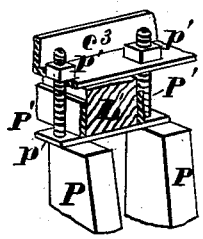
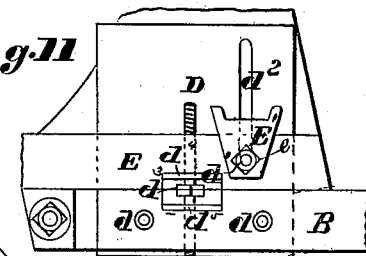
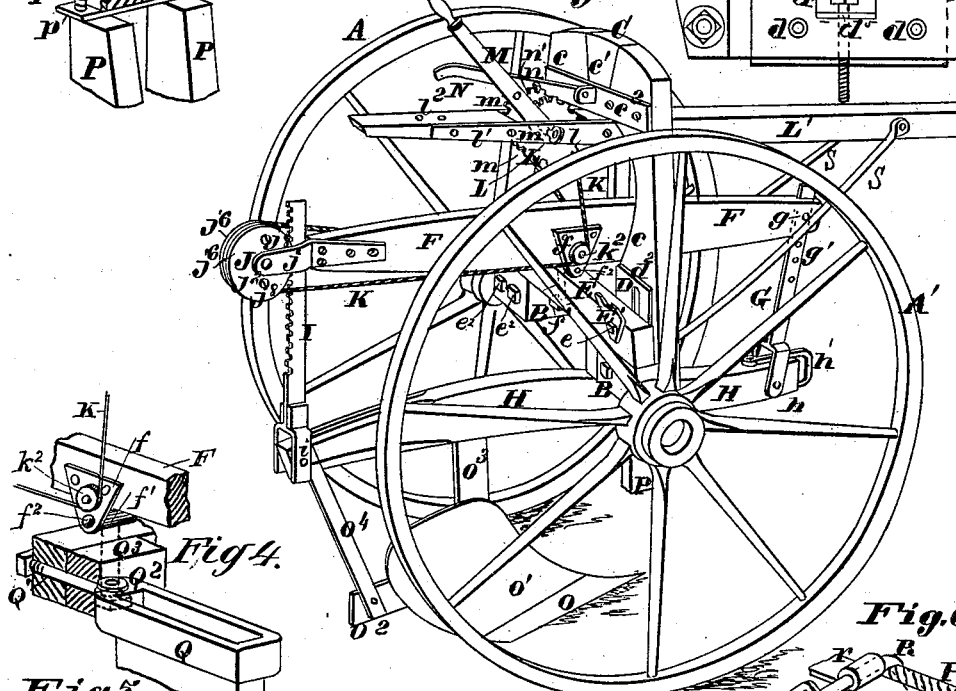
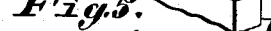
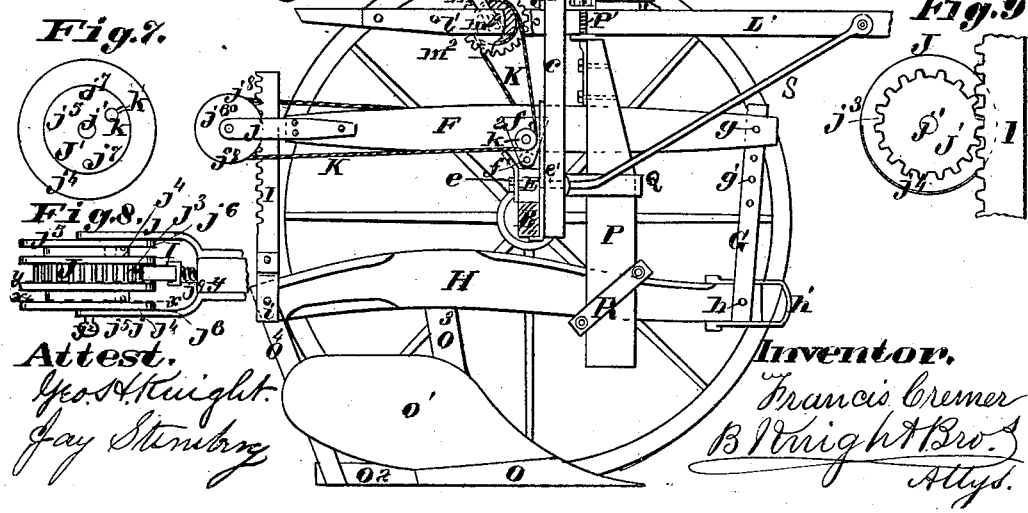
Attest.
Geo. H. Knight.
Jay Steinberg.
Inventor.
Francis Cremer
B. Knight & Bro.
Attys.

(Model.)
2 Sheets—Sheet 2.
F. CREMER.
COMBINED PLOW AND CULTIVATOR.
No. 254,620.
Patented Mar. 7, 1882.
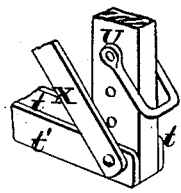
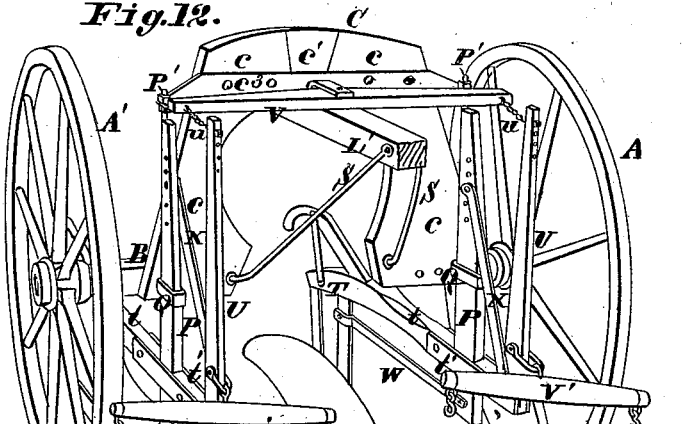
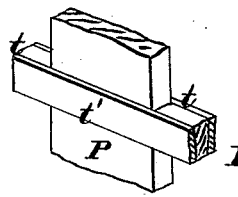
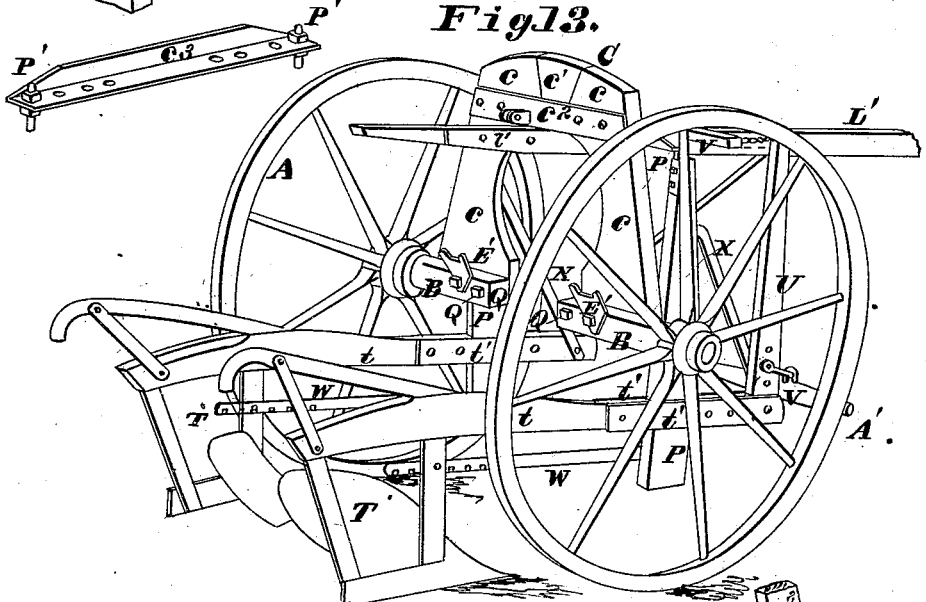
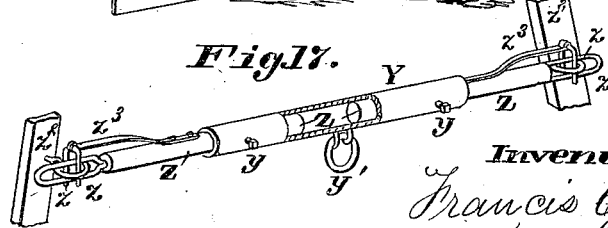
Attest:
Geo. H. Knight
Jay Stemberg
Inventor:
Francis Cremer
By Knight & Bro.
Attys.

UNITED STATES PATENT OFFICE.

FRANCIS CREMER, OF ST. LOUIS, MISSOURI.

COMBINED PLOW AND CULTIVATOR.

SPECIFICATION forming part of Letters Patent No. 254,620, dated March 7, 1882.

Application filed September 12, 1881. (Model.)

*To all whom it may concern:*

Be it known that I, FRANCIS CREMER, of the city of St. Louis, in the State of Missouri, have invented a certain new and useful Improvement in Combined Plow and Cultivator, of which the following is a full, clear, and exact description, reference being had to the accompanying drawings, forming part of this specification.

In the drawings, Figure 1 is a perspective view of my invention arranged for plowing. Fig. 2 is a longitudinal section of same. Fig. 3 is a detail perspective view of the upper ends of the vertical uprights to which the plow-beam is attached, showing the manner of their attachment to the tongue. Fig. 4 is a detail perspective view, showing the mode of hinging the upper beam to the cross-beam, and one of the sockets in which said uprights work, and its connection to the carriage-frame, and of this latter feature Fig. 5 is an enlarged perspective view. Fig. 6 is a detail perspective view, showing the attachment of the plow-beam to the uprights. Fig. 7 is a section at $x\ x$, Fig. 8. Fig. 8 is a top view of the wheel, showing its connection to the rear end of the horizontal rocking beam for raising and lowering the plow. Fig. 9 is a section at $y\ y$, Fig. 8. Fig. 10 is a perspective view of my method of securing the hoisting-rope to the wheel. Fig. 11 is an enlarged rear view of a portion of the frame-work of the cultivator, showing the means for the vertical adjustment of the furrow-wheel. Fig. 12 is a front perspective view of my invention arranged for cultivating. Fig. 13 is a rear perspective view of same. Fig. 14 is an enlarged detail perspective view of the draft-attachment device. Fig. 15 is a detail perspective view of one of the uprights shown in Fig. 3 and its connection with the cultivator-beam. Fig. 16 is a perspective view of the angle-iron secured to the yoke C, and to which the upper ends of the uprights are adjustably secured. Fig. 17 is a perspective view, part in section, of my improved neck-yoke, by which the draft-animals are kept the proper distance apart.

A A′ are the ground-wheels of the carriage, having short axles B, whose inner ends are secured to the ends of the yoke C. The yoke C is made of wood, and consists of three separate pieces, two vertical pieces, $c\ c$, whose upper ends are connected together by metal plate $c^2$ and angle-iron $c^3$, and which are formed to receive a wedge-shaped piece of wood, $c'$, which forms the other member of the yoke. By making the yoke in this manner it has great strength given it without increasing the amount of material or the cost of manufacturing it.

The axle of the furrow-wheel A′ is attached to the yoke C through the means of a slotted metal plate, D. The plate is securely fixed to the axle by bolts or rivets $d$, as shown in Fig. 11, and the plate is secured to the yoke by means of a bolt, $d'$, passing through the yoke and through the slot $d^2$ in the plate.

$d^3$ is a double-ended screw-bolt, having right and left threads, the upper half of which screws through a metal plate, $d^4$, and through the cross-beam E, and the lower portion of which screws through a metal plate, $d^5$, and through the axle B. The middle of the screw-bolt is provided with a square portion to receive a wrench, and part of the axle B and cross-piece E is cut away to allow access to the square part of the bolt. Thus it will be seen that the height of the furrow-wheel may be regulated at will to any depth of furrow by simply loosening the nut $e$ on the bolt $d'$, turning the bolt $d^3$ to the right or left, as the case may be, and retightening the nut. The bolt $d'$ also passes through one end of the cross-beam E, whose other end is secured to the opposite end of the yoke C by bolt $e'$ and nut or rivet $e^2$. The bolts $d'$ and $e'$ and nuts $e$ and $e^2$ also secure in place stirrups E′, which form rests for the driver's feet.

F is a beam placed above and parallel to the plow-beam. The beam F is connected to the cross-beam E by brackets $f$, secured to the beam F, and T-headed bolt $f'$, secured to the cross-beam E. The bracket and bolt are connected together by a pin, $f^2$, passing through them. By this connection the beam F will be allowed to rock on the cross-beam. The forward end of the beam F is slotted to receive the upper end of the hanger G, which is connected thereto by a pin, $g$, passing through the beam and any one of a series of holes, $g'$, in the top of the hanger. The lower end of the hanger G is forked and straddles the forward end of the plow-beam H, to which it is secured by a pin, $h$, passing through them. The purpose of this hanger G is to support the forward end of the plow-beam.

$h'$ is the draft-clevis, secured to the end of the plow-beam H in any ordinary manner.

To the rear end of the beam F is supported the rear end of the plow-beam H by the following means:

I is a vertical rack, secured to the plow-beam by a bolt, $i$.

J is a wheel or pulley, secured by horizontal arms $j\ j$ to the end of beam F. The connection between the arms $j$ and the wheel J permits the free rotary movement of the latter. I claim novelty in the construction of this wheel J, which I will now describe.

$J'$ is the hub, having an axle-hole, $j'$, for receiving the pin $j^2$, which secures it to the arms $j$, and upon which it turns. The center of the hub $J'$ is formed with cogs $j^3$, as shown in Figs. 8 and 9, on each side of which are annular rings $j^4$, made in one piece with the hub, and outside of which are smooth portions $j^5$ of the hub, to each of which is secured a ring or disk, $j^6$, of the same diameter as the rings $j^4$. They are secured to the hub by means of screws $j^8$ passing through screw-holes $j^7$ in the hub. Thus the wheel consists of a hub with an axial bore and four rings or disks, which form three annular grooves. In the middle groove, between the two inner rings or disks $j^4$, the rack I has vertical play, the cogs on the rack engaging with the cogs on the wheel. (See Figs. 8 and 9.) The rack is kept into engagement with the wheel by means of the spiral spring $j^9$, interposed between the back of the rack and the end of the beam F. The rack passes up between the arms $j\ j$. Thus it will be seen that as the wheel J is turned the plow will be raised to take less furrow or to be drawn entirely out of the ground. My device for turning the wheel J is as follows:

K is a wire rope, one end of which is secured to a metal plug, $K'$, which is secured to the wheel J by removing one of the outer disks $j^6$ and inserting the plug into the hole $k$ in the hub $J'$, the rope passing out through the groove $k'$ between the hole and the outer face of the hub. Then the disk is replaced, which securely fastens the rope to the wheel. This end of the rope winds around the wheel as it is turned in the groove between the disks $j^4$ and $j^6$. From this point the rope passes forward under the grooved pulley $k^2$, secured to the beam F at or near its bearing on the cross-beam E. From thence the rope passes up to and is wound around the grooved pulley L several times. The grooved pulley L has revoluble bearing on a pin, $l$, securing it to the tongue $L'$. From the pulley L the rope passes down and beneath a pulley similar to and opposite that, $k^2$, on the other side of the beam F. From there the rope passes back to the opposite side of the wheel J from that to which its other end is secured, where it is fastened in the same manner as described for the other end of the rope. One end of the rope winds around the wheel from beneath and the other end from above, so that as one winds up the other unwinds.

The tongue $L'$ is made in two pieces, connected together by horizontal arms or plates $l'$, a space being left between the two pieces, and in this space the pulley L works on the pin $l$ passing through the arms $l'$. The pulley L is turned by the lever M, which has an elongated hole, $m$, in its lower end, (see Figs. 1 and 2, where it is shown in dotted lines,) through which the pin $l$ passes. $m'$ is a pin riveted to the lever M. The flanges of the pulley are formed with ratchet-teeth. When the pulley is to be turned the lever is drawn outward in the direction of its length, moved forward or backward, as the case may be, and then forced downward, which engages the pin $m'$ with the teeth of that side of the pulley. Thus the pulley is turned to lower or raise the plow through the means of the rope K, wheel J, and rack I.

N is a locking-lever, pivoted at the other side of the pulley L from that to which the lever M is secured.

$n$ is a pin on the lever N, which engages with the ratchet-teeth $n'$ on the flange of this side of the pulley L. Thus when the pulley L is turned to any adjustment the lever N will hold it at that point, and is simply raised when the pulley is to be turned.

The driver's seat, when in place, (I have not shown it,) is secured to the rear end of the tongue by bolts passing through holes $l^2$.

The plowshare O, mold-board $O'$, and landside $O^2$ are of common construction, and are connected to the beam by standard $O^3$ and hanger $O^4$. The draft-animals are connected to the plow-beam by clevis $h'$.

I will now describe the draft-connection between the plow-beam and the carriage for propelling the latter.

P P are vertical uprights, of wood, which have bolted to their upper ends rods $P'\ P'$, (screw-threaded at the upper ends,) which secure them to the angle-iron $c^3$ near the tongue $L'$. The rods $P'$ pass through a plate, $p$, beneath the tongue, and are secured in place above the angle-iron by nuts $p'$. Thus the uprights are held from moving vertically. The uprights are connected to the cross-beam E by sockets Q, through which they pass. The sockets are connected to the beam by bolts $Q'$. (See Figs. 4 and 5.) The connection between the sockets Q and bolts $Q'$ is by knuckle-joints $Q^2$, so that a free lateral movement is allowed between them, and if the plow should strike any heavy obstacle it will pass around it and at once be drawn back to its proper place by the draft on the forward end of the plow-beam. The uprights straddle the plow-beam H, and are connected thereto by a clevis, R. The clevis R is securely fastened to the beam by a strap, $r$, above, and a staple, $r'$, beneath; but the uprights work loosely in their bearings between the clevis and the plow-beam, so that the free (No Model.)
J. E. CRISP.
TACKING MACHINE.
No. 254,621. Patented Mar. 7, 1882.
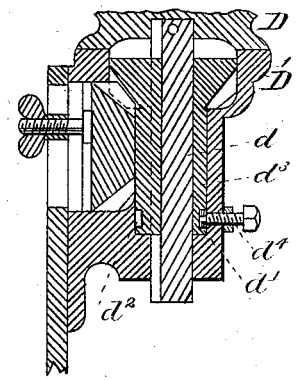
Fig. 2.
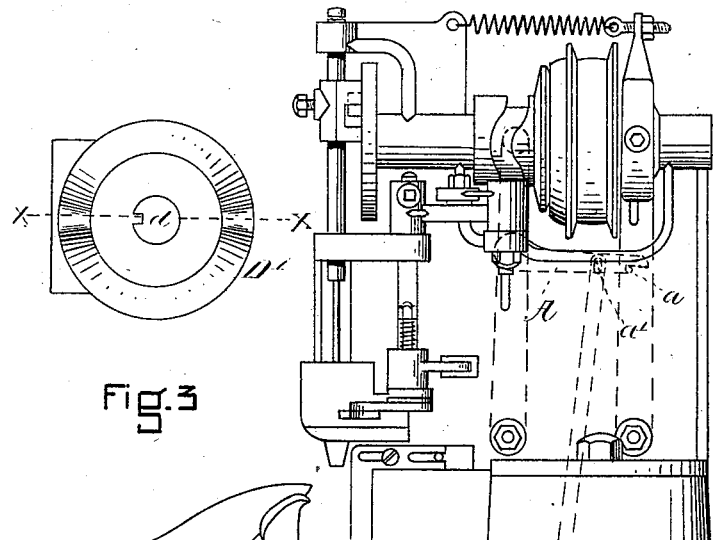
Fig. 3.
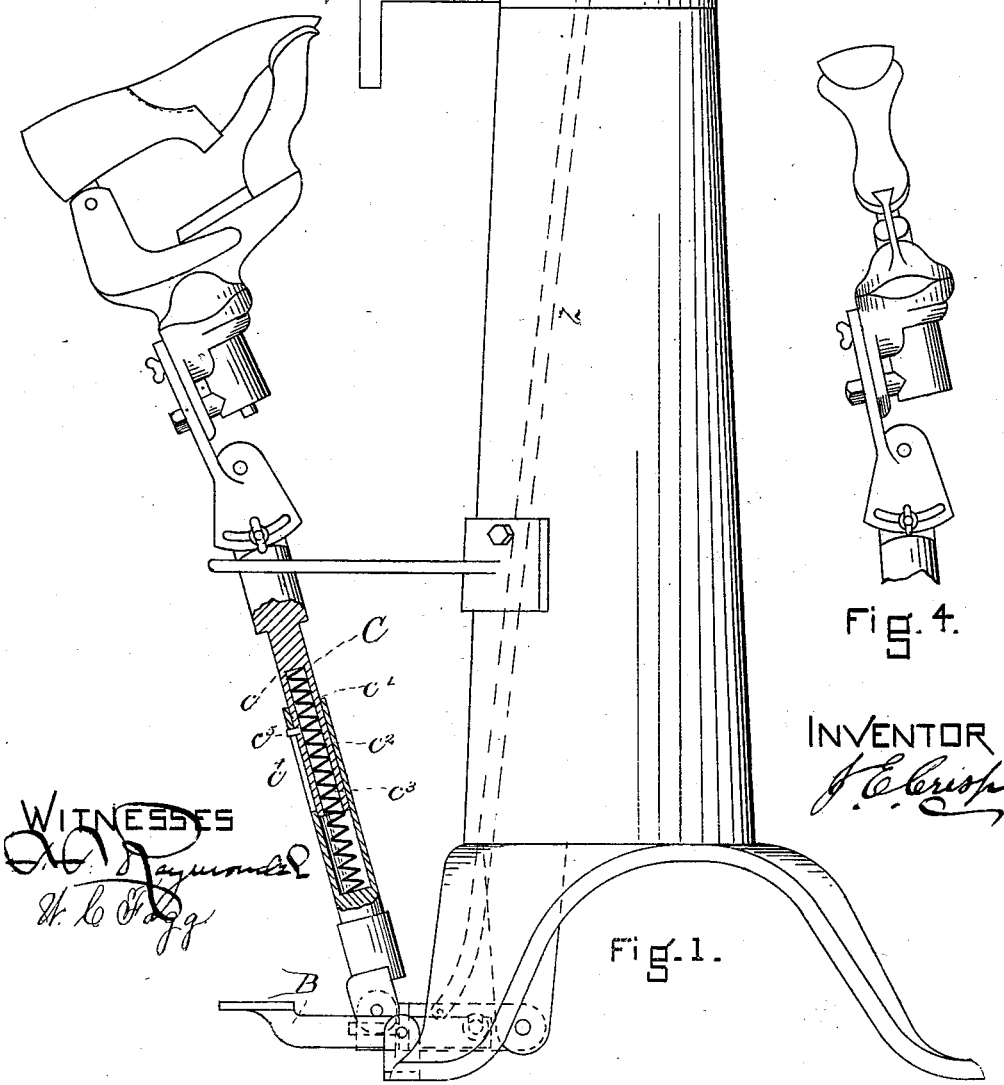
Fig. 1.
Fig. 4.
WITNESSES
INVENTOR